United States Patent [19]

Depret

[11] Patent Number: 4,796,668

[45] Date of Patent: Jan. 10, 1989

[54] DEVICE FOR PROTECTING THREADINGS AND BUTT-TYPE JOINT BEARING SURFACES OF METALLIC TUBES

[75] Inventor: Jean-Paul Depret, Aulnoye Aymeries, France

[73] Assignee: Vallourec, France

[21] Appl. No.: 763,140

[22] PCT Filed: Jan. 7, 1984

[86] PCT No.: PCT/FR85/00003

§ 371 Date: Jul. 18, 1985

§ 102(e) Date: Jul. 18, 1985

[87] PCT Pub. No.: WO85/03104

PCT Pub. Date: Jul. 18, 1985

[30] Foreign Application Priority Data

Jan. 9, 1984 [FR] France .................. 84 00700

[51] Int. Cl.⁴ ............................................. F16L 55/10
[52] U.S. Cl. .................................. 138/96 T; 138/96 R
[58] Field of Search ........................... 138/96 R, 96 T

[56] References Cited

U.S. PATENT DOCUMENTS

| | | | |
|---|---|---|---|
| 2,258,066 | 10/1941 | Oyen | 285/328 |
| 2,930,118 | 3/1960 | Higgins | 138/96 T |
| 3,578,200 | 5/1971 | Hetzer | 138/96 T X |
| 4,157,100 | 6/1979 | Turk | 138/96 T |
| 4,210,179 | 7/1980 | Galer | 138/96 T |
| 4,487,228 | 12/1984 | Waldo et al. | 138/96 T |
| 4,582,090 | 4/1986 | Chose et al. | 138/96 T |

FOREIGN PATENT DOCUMENTS 3100527 7/1982 Fed. Rep. of Germany .... 138/96 T

Primary Examiner—James E. Bryant, III
Attorney, Agent, or Firm—Jones, Day, Reavis & Pogue

[57] ABSTRACT

A device for protecting, before use, threadings and butt-type joint bearing surfaces (66) which contribute to the hermetic character and to the threadings (55) of male or female joining regions of metallic tubes.

It comprises a ring (56) of plastics material which is screwed onto the threading (55) of the metallic tube (54). A first lip (63) rests in a resilient tight manner on the joint bearing surface (66) in the vicinity of the inner edge (65) thereof. A closed annular volume (67) protects the bearing surface of the joint. A second lip (59) protects the threaded region.

This device is used in particular for the frustoconical joint bearing surfaces of tubes with a frustoconical threading. The ring can be clothed by a metallic reinforcing sleeve (68).

12 Claims, 4 Drawing Sheets

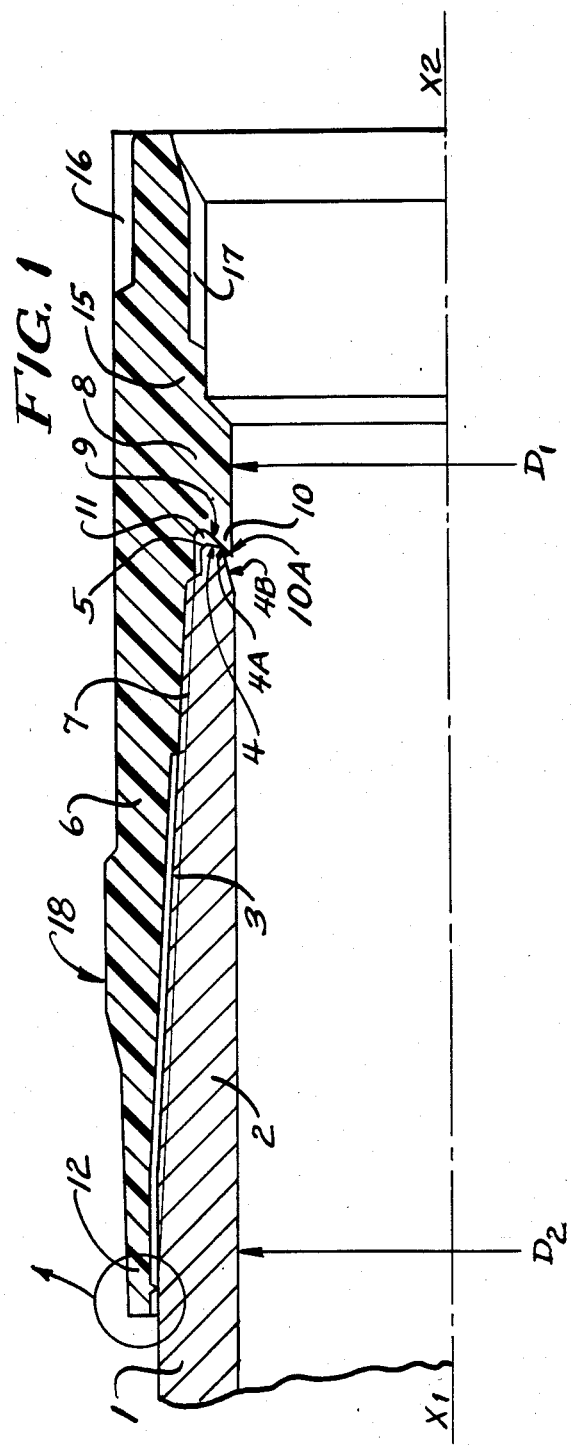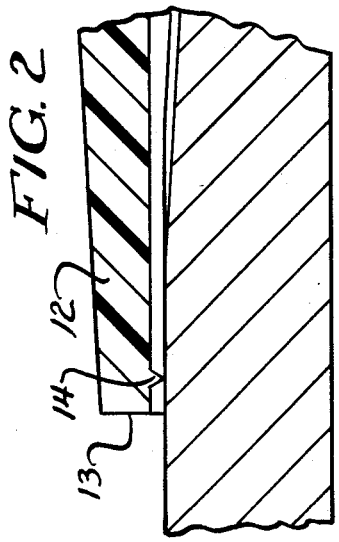

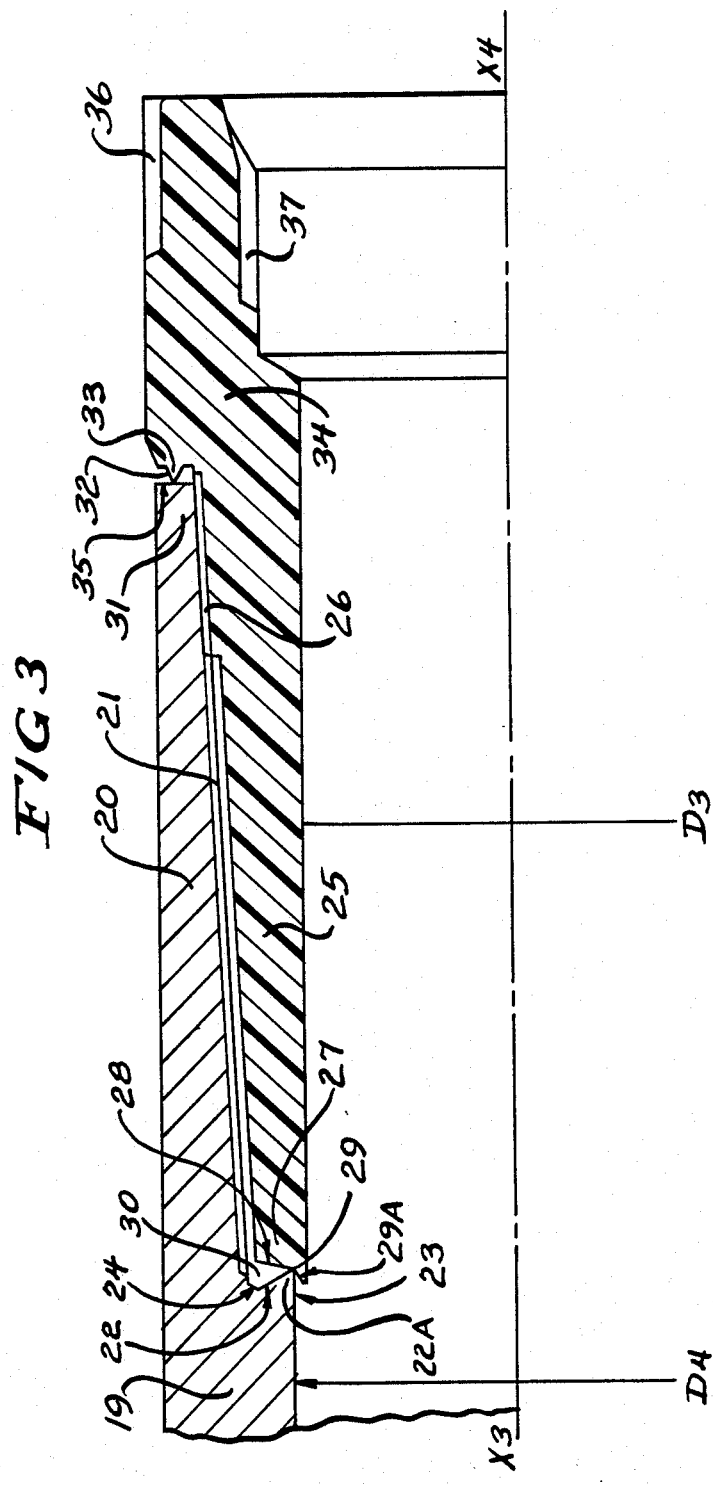

DEVICE FOR PROTECTING THREADINGS AND BUTT-TYPE JOINT BEARING SURFACES OF METALLIC TUBES

The device which is the subject of this invention relates to the protection, before use, of threadings and butt-type joint bearing surfaces which make-up threaded couplings between metallic tubes of circular cross-section and which contribute to the hermetic character of these couplings. This device relates to the threaded couplings of metallic tubes which are connected to each other in a direct manner or by means of threaded couplings or sleeves.

This device relates in particular to the protection of butt-type joint bearing surfaces and threadings of tubes used for the drilling of oil wells, or for the exploitation (tubing) of these wells, or even for the casing of these wells.

The threaded coupling described in FR No. 1 489 013 in particular is known among the different types of threaded couplings which have been developed. The butt-type joint bearing surface which should ensure the hermetic character of the joint has a concave frustoconical annular surface, worked at the male end of a tube, which comes to a stop against a convex frustoconical annular surface which is worked in the vicinity of the inner end of the female threading.

The hermetic character of the coupling depends on the quality of the threadings and the butt-type joint bearing surfaces, a quality which can be deteriorated either by impact, during transportation for example, or by corrosion, particularly on contact with salt water or other aggressive media.

Different devices have been proposed for protecting the joining regions of threaded tubes.

Patent Application DE-OS No. 2 834 489 describes an elastomeric or plastics protective cover which covers the outer threading of a tube. Inner raised regions, which are substantially parallel to the axis, ensure that the cover is held on the threads. The device can also be adapted to protect an inner threading.

This device is not intended for the protection of joint bearing surfaces and, not having a hermetic character, does not protect against corrosion.

Utility model DE-GBM No. 7 800 484.9 describes a protecting device for male or female frustoconical threadings at the ends of steel tubes, comprising a component of flexible material, such as an elastomer, to which there is connected a tubular reinforcing section of steel. The component of flexible material is provided with a frustoconical threading which threadingly engages the steel tube and comprises two sealing joints, one of which engages with the front end of the tube.

Such a device does not enable the butt-type joint bearing surfaces, such as the frustoconical bearing surfaces described in FR No. 1 489 013, to be effectively protected. Indeed, it is difficult to screw correctly the threads of a flexible material and it is difficult to control the tight compression of the joint onto the abutment regions. Finally, the flexibility of the material means that its protecting function with respect to the impacts received in the regions not covered by the reinforcing section, is poor.

Patent Application GB No. 2 093 426 describes a cover for protecting the outer tube threading. It comprises an outer sheath, preferably of steel, and an inner wall, preferably of impact-resistant plastics material. The inner wall is threaded so that it screws onto the outside of the tube. The extreme edge of the tube is protected by a rounded rim of the cover which covers it.

This device is not designed to protect the butt-type joint bearing surfaces, such as the frustoconical bearing surface against corrosion. Moreover, it does not have any means for ensuring protection against corrosion of the region covered by the cover. Finally it can not be used for the protection of the inner threadings of tubes.

A study has been made of producing a device which can ensure the effective protection against corrosion and impacts, before use, of threadings and butt-type joint bearing surfaces, which make-up threaded couplings of metallic tubes. A study in particular has been made of the possibility of protecting the inner or outer threadings and the butt-type joint bearing surfaces, such as those described, for example in Patent No. FR 1 489 013.

A study has also been made of the possibility of maintaining a certain volume of a protective fluid in contact with the butt-type joint bearing surfaces.

Finally, a study has been made of the possibility of producing a protecting device which is simple to assemble and disassemble, which is resistant to impacts and vibratons and permits, if required, the free passage inside the metallic tube of tools or measuring instruments, without disassembly.

The device for protecting the threaded couplings of metallic tubes which is the subject of the present invention allows this problem to be solved in a particularly simple and advantageous manner. This device relates to the protection of the threadings and butt-type joint bearing surfaces of metallic tubes and particularly the butt-type joint bearing surfaces with frustoconical surfaces described in FR No. 1 489 013.

This device comprises a ring of rigid plastics material, furnished with a threading which engages, by screwing, into the male or female threading of the joining region, furnished with a butt-type joint bearing surface, of a metallic tube or tubular coupling. This ring comprises an annular abutment region the front face of which is positioned so that it faces the joint bearing surface of the metallic tube when the ring is tightly screwed onto the tube. The inner edge of this front face is equiped with a first annular sealing means which co-operates with the joint bearing surface of the tube, in the vicinity of the inner edge thereof, to ensure an hermetic character. The profile of this front face is produced by taking into account the profile of the joint bearing surface of the tube so as to delimit an annular volume between this front face and the joint bearing surface which is closed owing to the tight bearing provided in the vicinity of the inner edges of this front face and this joint bearing surface.

This closed annular volume is advantageously filled, at least partially, with a fluid, such as a lubricant, which protects the joint bearing surface, particularly against corrosion.

The ring may also have a second annular sealing means, whose action is combined with that of the first. This second means is arranged so that it forms a tight bearing against the metallic tube, when the ring is screwed tightly, in the vicinity of one end of its threading, the butt-type joint bearing surface being located in the vicinity of the other end of this same threading. The first annular sealing means is advantageously a lip formed by the inner edge of the front face of the ring.

The second sealing means can also be an annular lip, integral with the ring, the profile of which is such that it is in contactof an hermetic type with the wall of the tube when the ring is screwed on tightly. This second tight sealing means can also be an inserted joint, such as an O-ring joint, accommodated, for example, in an annular housing provided in the ring.

The region of the ring facing the threading of the metallic tube, when it is screwed on tightly, can have only several threads, the remainder of the surface being smooth.

The ring advantageously is also furnished with a rear region which extends beyond the end of the tube when it is screwed on tightly. This region can be equiped with holding means, such as projections which facilitate the holding of screwing or unscrewing instruments. These projections which are preferably parallel to the axis, are arranged on the inner and/or outer wall of the ring.

The main part of the surface of the ring, can be clothed, on the unthreaded side, with a metallic sleeve, which is made integral with the ring by any suitable means, to increase the impact-resistance of the ring. This sleeve can extend beyond the end of the plastic ring in the direction away from the metallic tube. This sleeve can then be adapted so that it has a region equiped with holding means, such as projections which facilitate the holding of screwing or unscrewing instruments.

The inner diameter of the plastics ring, whether clothed or not with a metallic sleeve, is such that it permits the free passage of tools or measuring instruments, without the protecting device having to be unscrewed. Alternatively, for certain applications, the protecting device can be closed by a sealing circular bottom, integral with the ring of plastics material or with the sleeve with which it can be clothed. This circular bottom can be removable.

A plastics material with good hardness and elasticity characteristics, such as a polyurethane-based material, is advantageously used to produce the ring. A plastics material which also has very good impact resistance, particularly at low temperature, is advantageously used particularly when the ring is not clothed with a metallic sleeve. Modified polyamides, for example or certain polyethylene qualities can be used to provide increased impact resistance.

The metallic sleeve with which the ring can be clothed is made-up of a suitable metal or alloy, such as ordinary, alloyed or stainless steel.

The device according to the invention is suitable, more particularly, for protecting the joining regions of metallic tubes with frustoconical male or female threadings. The ring then has corresponding threadings, preferably limited to a few threads. The centering of the ring before screwing is thereby facilitated, the jamming by superposition of threads is avoided and the screwing and unscrewing time is reduced. Finally the invention relates to the plastics ring itself, whether clothed or not with a metallic sleeve, which enables the device according to the invention to be produced.

The following description and Figures allow a better understanding in a non-limited manner, of the main characteristics of the protecting device according to the invention, as well as the advantageous characteristics of particular embodiments of this device.

FIG. 1 is an axial half-section of a protecting device according to the invention made up of a ring of plastics material screwed onto the male end of a metallic tube.

FIG. 2 is an enlarged view of part of FIG. (1) showing the position of the second sealing means, with which the ring of plastics material is provided.

FIG. 3 is an axial half-section of a protecting device according to the invention made up of a plastics ring screwed onto the female end of a metallic tube.

Figure 4:
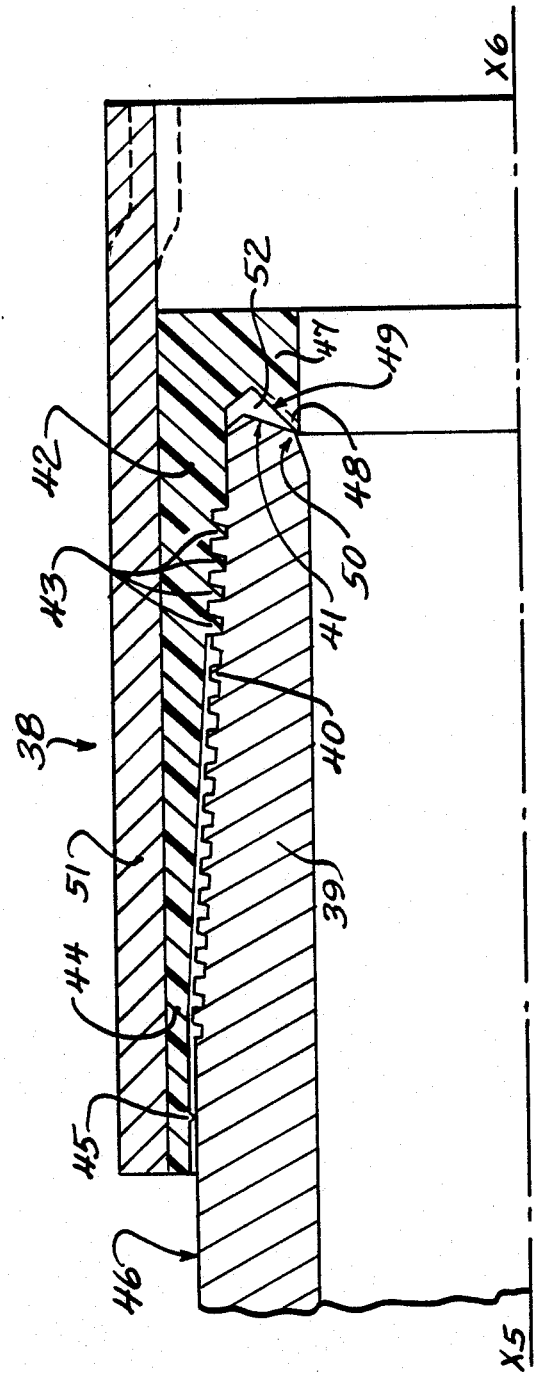
FIG. 4 is an axial half-section of a protecting device according to the invention made up of a plastics ring, clothed with a metallic sleeve, screwed onto the male end of a metallic tube.

FIG. 1 shows, in an axial half-section, a metallic tube (1) of circular cross-section with axis $(X_1-X_2)$, the male joining region (2) of which is protected by a device according to the invention. This joining region has an outer frustoconical threading (3) and a concave butt-type frustoconical joint bearing surface (4), the generating line of which is inclined by from about 15° to 25° with respect to a plane perpendicular to $(X_1-X_2)$. The bearing surface (4) is connected to the end of the threading (3) by a chamfer (5).

The protecting device comprises a one-piece ring (6) of plastics material provided with an inner threading (7) having only a few threads, which is screwed tightly onto the threading (3) of the tube until it has been screwed to a stop. The abutment region (8) of the ring has an annular front region (9) facing the bearing surface (4) of the joint. The inner edge of this front face has a first annular sealing means, formed by the lip (10) which, owing to the screwing of the ring onto the tube, forms a tight bearing on the bearing surface of the joint, in the vicinity of the inner edge (4A) of this bearing surface. It can be observed that, in the embodiment of the device according to the invention shown in FIG. 1, the annular lip (10) oriented towards the inside of the tube is engaged inside the circle formed by the inner edge (4A) of the bearing surface (4). The outer edge (10A) of the lip (10) therefore faces the inner wall of the tube (1) in the connection region (4B) to the inner edge (4A) of the joint bearing surface (4), when the ring is screwed on tightly. Under these conditions, the inner edge (4A) bears against the front face (9) in the connection region between the outer edge (10A) of the lip (10) and the section of the front face which faces the bearing surface of the joint (4). A closed annular volume (11) is enclosed between this front face and this bearing surface of the joint. This volume, of a substantially triangular cross-section in this Figure, is preferably filled with a protecting fluid, such as a lubricant. It can be observed that, due to the particular arrangement of the lip (10) shown in the Figure, the bearing surface (4) of the joint is protected by the protecting fluid contained in the closed annular volume (11) over the entire surface thereof. Moreover, the projection of the lip (10), in a direction substantially parallel to the axis, towards the inside of the tube, forms a sort of labyrinth which limits the losses of protecting fluid wherever there is a loss of sealing at the level of the contact between the inner edge (4A) of the bearing surface (4) and the front face (9) of the abutment region (8) of the ring (6).

The ring can have a second sealing means situated beyond the threading region (3) with respect to the bearing surface (4) of the joint to improve the sealing of this closed space, and also to protect the threading region. This second means is shown in an enlarged manner in FIG. 2 which is a detail of FIG. 1. It shows the introduction region (12) of the ring (6) around the tube (1). It can be seen that in the vicinity of the introduction edge (13) of the ring (6), a lip (14) is provided oriented radially towards the axis ($X_1$-$X_2$) which rests on the outer wall of the tube. This lip forms the second sealing means. The dimensions thereof are such that when the ring is screwed on tightly, it rests tightly and resiliently on the outer wall of the tube. The penetration of corrosive fluids between the ring and the tube, in the direction of the threading (3) and the closed volume (11) is thereby prevented. The minimum inner diameter ($D_1$) of the ring is greater than the inner diameter ($D_2$) of the tube in a running section, thereby permitting the passage of tools and measuring instruments. The region (15) of the ring which extends beyond the end of the tube has projections, such as (16,17), formed on the outer and inner walls respectively. These projections are substantially parallel to the axis and permit the holding of instruments for screwing or unscrewing. The thickness of the ring is determined such that the ring withstands the impacts caused by handling of the tube and effectively protects the end region thereof. Thus an extra thickness (18) is provided in the vicinity of the introduction region (12) of the ring which may be subjected to substantial stresses and impacts. This extra thickness enables in particular impacts perpendicular to the axis $X_1$-$X_2$ to be absorbed.

FIG. 3 shows, as an axial half-section, the protecting device according to the invention mounted on the end of a rotatory metallic tube (19), with axis ($X_3$-$X_4$), to protect the female joining region (20) thereof. This region comprises an inner frustoconical threading (21) and a convex butt-type frustoconical joint bearing surface (22). This tube can also be a coupling or sleeve used to assemble tubes having joining regions with a male frustoconical threading.

The generating line of the joint bearing surface (22) is inclined by from 15° to 25° with respect to a plane which is perpendicular to the axis ($X_3$-$X_4$). This joint bearing surface is connected to the end of the threading region of the tube by a chamfer (24).

The protecting device comprises a single-piece ring (25) of plastics material, provided with an outer threading (26) having only several threads, which is screwed tightly onto the inner threading of the tube until it is screwed to a stop. The abutment region (27) of the ring has a frontface (28) facing the joint bearing surface (22).

As in FIG. 1, the annular lip (29), oriented towards the inside of the tube (19) is engaged inside the circle formed by the inner edge (22A) of the joint bearing surface (22). This inner edge (22A) is located at the intersection of the bearing surface (22) and the inner wall (23) of the tube (19).

When the ring is screwed on tightly, as shown in the Figure, this inner edge (22A) rests against the front face (28) in the connection region between the outer edge (29A) of the lip (29) and the section of this front face (28) which faces the bearing surface (22) of the joint. The generating line of this section of the front face is inclined with respect to that of the bearing surface of the joint so as to set aside a closed annular volume (30) which may be filled with a protecting fluid, such as a lubricant. The projection of the lip (29) towards the inside of the tube (19) forms a sort of labyrinth, limiting the losses of protecting fluid, and thereby the risk of penetration of corrosive fluids, where a loss of sealing is produced at the level of the contact between the inner edge (22A) of the joint bearing surface (22) and the front face (28).

To complete the protection, particularly with regard to the threading (21) of the tube (20), a second sealing means is provided beyond this threading, with respect to the bearing surface (22) of the joint, between the ring and the end region (31) of the tube. This second means is an annular lip (32), attached at a break in contact (33) of the reinforced rear wall (34) of the ring (25), which resiliently and tightly rests on the end face (35) of the tube (20). The dimensions of the ring (25) are determined so that, when it is screwed on tightly, tight contacts are simultaneously produced at the level of the first and the second sealing means. The threading (21) and the closed volume (30) are thus protected, in a particularly effective manner, against the penetration of corrosive fluids, such as sea water.

The reinforced annular region (34) of the ring permits the end region (31) and the face (35) of the tube to be protected from impact. This reinforced region (34) has projections, such as (36, 37) provided on the outer wall and the inner wall respectively, which permit the holding of screwing or unscrewing instruments. The minimum inner diameter ($D_3$) of the ring is slightly less than the inner diameter ($D_4$) of the tube in a running section so as to permit the passage of tools or calibrating instruments of conventional types.

Figure 5:
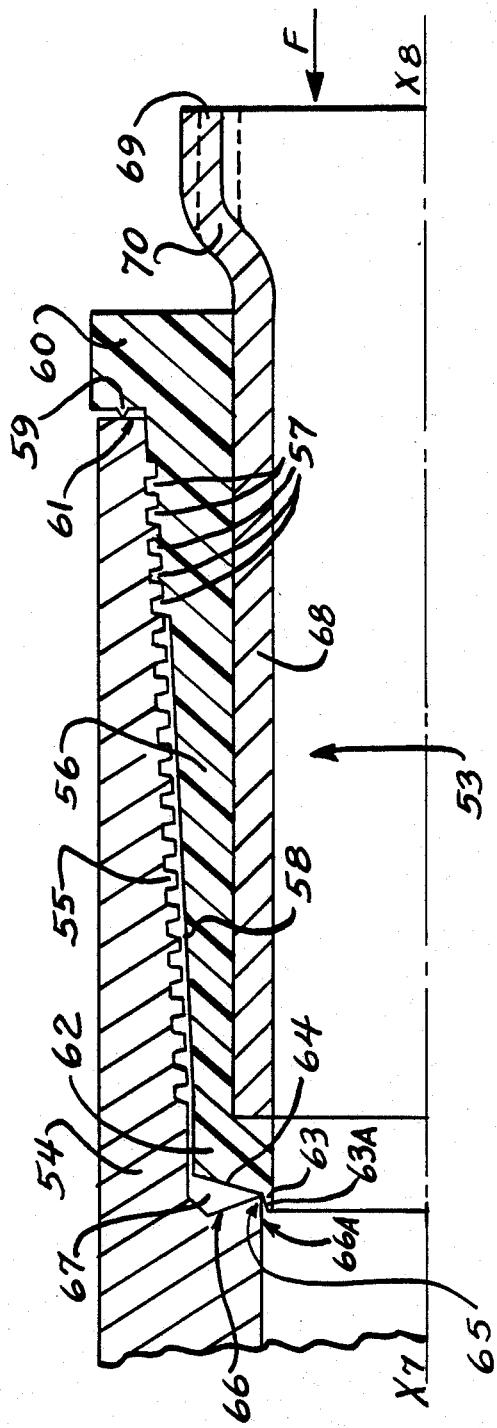
FIG. 5 is an axial half-section of a protecting device according to the invention made up of a plastics ring, clothed with a metallic sleeve, screwed onto the female end of a metallic tube.
Figure 6:
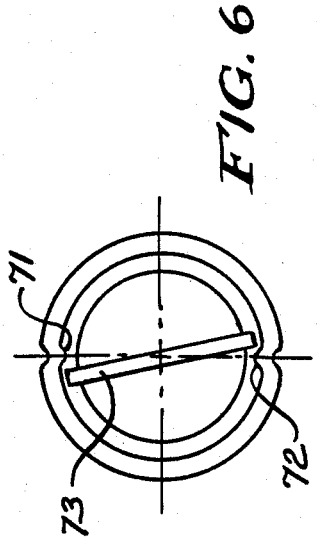
FIG. 6 is an end view, along arrow F, of the extended section of the metallic sleeve shown in FIG. 5.

FIGS. 4 to 6 show an embodiment of the device according to the invention in which the plastics ring is clothed by a metallic sleeve to increase the impact-resistance thereof.

FIG. 4 shows, as an axial half-section, a particular embodiment of a protecting device (38) according to the invention, provided about the end of a metallic tube (39), with axis $X_5 X_6$, provided with a male frustoconical threading (40) and, at the end, with a concave butt-type frustoconical joint bearing surface (41). This device comprises a plastics ring (42) having only a few threads (43).

The entire inlet region (44) of this ring, over more than half of the frustoconical bearing surface, is smooth. This ring is shown screwed tightly onto the tube.

A small annular lip (45) rests on the outer cylindrical wall (46) of the metallic tube (39) at the end in front of the inlet region (44) of the ring (42). It forms the second sealing means. The ring (42) has, moreover, an abutment region (47), whose lip (48), which forms the inner edge of the front face (49), rests on the inner edge (50) of the bearing surface (41) of the joint. This lip (48) forms the first sealing means. A closed annular volume (52) is thereby formed between the bearing surface (41) and the front face (49).

The ring (42) is clothed on its outer wall by a metallic sleeve (51) which extends beyond the end of the ring, beyond the end of the tube and thereby protects the tube from localised impacts. This sleeve can, for example, be of mild steel. It is advantageous to provide as solid a connection as possible between the ring and the sleeve. For this purpose, it is possible in particular to use the sleeve as one of the walls of a mould, inside which the ring of plastics material is shaped. Moreover, projections and/or cavities on which the plastics material catches can also be provided on the inner wall of the sleeve (51). Other connecting means can also be provided.

FIG. 5 shows, as an axial half-section, a protecting device (53) according to the invention, provided on the end of a metallic tube (54), with axis of revolution $X_7 X_8$, provided with a female frustoconical threading (55). The plastics ring (56) has a few threads (57) at the end having the large diameter of the region of engagement at the end of the tube (54). An annular lip (59) formed on the rear flange (60) of the ring rests on the front edge (61) of the tube (54).

An abutment region (62) is provided at the end in front of the ring (56). As in the case of FIG. 3, an annular lip (63), oriented towards the inside of the tube (54), is engaged inside the circle formed by the inner edge (65) of the butt-type joint bearing surface (66). This inner edge (65) is at the intersection of the joint bearing surface (66) and the inner wall (66A) of the tube (54). When the ring is screwed on tightly, as is the case in the Figure, the inner edge (65) rests against the front face (64) in the joining region between the edge (63A) of the lip (63) and the section of the front face (64) facing the joint bearing surface (66). The generating line of this front face is inclined with respect to that of the joint bearing surface thereby forming a closed annular volume (67) which may be filled with a protecting fluid, such as a lubricant. The projection of the lip (63) towards the inside of the tube (54) forms a sort of labyrinth which limits the losses of protecting fluid and thereby the risk of penetration of corrosive fluids, particularly in the case where a loss of sealing is produced at the level of the contact between the inner edge (65) and the front face (64).

The lip (59) which forms the second sealing means furthermore improves the protection of the entire space between the ring (56) and the tube (54), thereby avoiding in particular the corrosion of the threading of the tube by the penetration of moisture.

A sleeve (68) is made integral with the ring (56) in the manner already described above. The extended section (69) with a greater diameter is connected to the section covered by the ring (56) by a fillet (70). This allows impacts received from outside to be withstood. Moreover, as shown by FIG. 6, which is a view, seen along arrow F, of the end region of the sleeve, two noses (71,72), parallel to the generating lines, forming projections inside, are provided on the extended section (69) of the sleeve (68). They permit the end (73), seen in cross-section, of a rotating tool, not shown, to be introduced into this extended section.

The protecting device (53) can thereby be assembled and diassembled very rapidly, the rotating tool (73) driving therotation of the sleeve due to the noses (71 and 72).

For certain applications, the ring (6, 25, 42), may have, in the vicinity of its rear end for example, a solid circular wall which closes in a hermetic manner, the way through the ring and therefore the inlet of the metallic tube onto which it is screwed. In the case of the ring being clothed by a metallic sleeve (51, 68) this solid circular wall can be integral with the sleeve itself. This circular wall can also be removed.

Numerous modifications can be made to the device according to the invention without exceeding the scope thereof. It is possible, as shown by FIG. 4, to use, as the first sealing means, a lip, which instead of being engaged inside the circle formed by the inner edge of the bearing surface of the joint, faces this bearing surface in the vicinity of the inner edge. An O-ring joint or another type of joint can be used as a second annular sealing means.

I claim:

1. A device for protecting male or female threadings and butt-type annular joint bearings of metallic tubes comprising:

a metallic tube provided with a joining region at one end thereof, said joining region including screw threadings which terminate in a butt-type joint having a butt-type bearing surface and inside and outside surfaces where said bearing surface and said inside surface meet to form an annular inner edge, a plastic ring provided with screwthreads for engaging said threadings of said metallic tube, said ring further having an annular abutment region provided with a front face which is dimensioned so as to face the butt-type bearing surface of the metallic tube when the ring is tightly screwed onto said tube, said front face having an inner surface which comprises a first annular tight sealing means which cooperates with the butt-type joint bearing surface near said annular inner edge to insure sealing, said front face being further dimensioned such that a closed annular volume is created between the entire butt-type joint bearing surface and said front face.

2. A device according to claim 1, wherein the first annular sealing means is a lip oriented toward the inside of the metallic tube and which, when the ring is tightly screwed on, is engaged inside a circle formed by the inner edge of the butt-type joint bearing surface in such a manner that the lip at its outer edge faces the inside surface of the tube.

3. A device according to claim 2, wherein the inner edge of the butt-type joint bearing surface is in contact with the front face of the annular abutment region of the ring between the outer edge of the lip and a section of the front face which faces the bearing surface of the joint.

4. A device according to one of claims 1 to 3, wherein the ring includes a second annular sealing means which, when the ring is tightened, rests against the metallic tube beyond one of the ends of its threading, the butt-type joint bearing surface being at the other end of this threading.

5. A device according to claim 1, wherein the closed annular volume is at least partially filled with a protecting fluid.

6. A device according to claim 1, wherein a metallic sleeve is made integral with the ring on its non-threaded side.

7. A device according to claim 6, wherein the ring and/or the metallic sleeve extend beyond the end of the metallic tube.

8. A device according to claim 7, wherein the portion of the ring or the metallic sleeve which extends beyond the end of the metallic tube is provided with holding means to permit the holding of instruments for screwing or unscrewing.

9. A device according to claim 1, wherein a circular wall closes the inlet of the metallic tube.

10. A device according to claim 1, wherein the ring is of polyurethane, polyamide or polyethylene material.

11. A device according to claim 1, in which said front face of said annular abutment region is inclined with respect to the bearing surface of the butt-type joint.

12. A device according to claim 11, wherein the cross-section of said closed annular volume is substantially triangular.

* * * * *

UNITED STATES PATENT OFFICE
CERTIFICATE OF CORRECTION

Patent No. 4,796,668           Dated   January 10, 1989

Inventor(s)  Jean-Paul Depret

It is certified that error appears in the above-identified patent and that said Letters Patent is hereby corrected as shown below:

On the face of the patent, after "PCT Filed:," change "Jan. 7, 1984" to -- Jan. 7, 1985 --.

On the face of the patent, under the title Foreign Priority Data, include the following:

-- Dec. 20, 1984[FR] France ......... 8419850 --

Signed and Sealed this

Thirtieth Day of July, 1991

Attest:

HARRY F. MANBECK, JR.

Attesting Officer

Commissioner of Patents and Trademarks